United States Patent [19]

Fushimi

[11] Patent Number: 5,101,388
[45] Date of Patent: Mar. 31, 1992

[54] DISK PLAYER SYSTEM WITH AN AUTOMATIC MAGAZINE CHANGER

[75] Inventor: Akihiro Fushimi, Kawagoe, Japan

[73] Assignee: Pioneer Electronic Corporation, Tokyo, Japan

[21] Appl. No.: 480,451

[22] Filed: Feb. 15, 1990

[30] Foreign Application Priority Data

Feb. 16, 1989 [JP] Japan ................................. 1-34971

[51] Int. Cl.⁵ ........................ G11B 17/22; G11B 17/26
[52] U.S. Cl. ........................................ 369/36; 369/38; 360/92
[58] Field of Search .................. 369/34, 35, 36, 38, 369/39; 360/92

[56] References Cited

U.S. PATENT DOCUMENTS

| | | | |
|---|---|---|---|
| 4,170,030 | 10/1979 | Castrodale | 369/38 X |
| 4,653,037 | 3/1987 | Nakayama et al. | 369/34 X |
| 4,701,900 | 10/1987 | Hasegawa et al. | 369/36 |
| 4,788,673 | 11/1988 | Ikedo et al. | 369/36 |
| 4,797,865 | 1/1989 | Imai et al. | 369/39 |
| 4,899,326 | 2/1990 | Takeya et al. | 369/33 X |
| 4,940,275 | 7/1990 | Miki et al. | 360/92 X |
| 4,967,293 | 10/1990 | Aruga et al. | 364/247 X |

FOREIGN PATENT DOCUMENTS 0168107 1/1986 European Pat. Off.
2126004A 3/1984 United Kingdom.

*Primary Examiner*—Stuart S. Levy
*Assistant Examiner*—Kenneth B. Wells
*Attorney, Agent, or Firm*—Sughrue, Mion, Zinn, Macpeak & Seas

[57] ABSTRACT

A disk player system comprises a disk player body including an outer casing and provided with a disk magazine insertion port through which a disk magazine is to be mounted in the disk player body which is capable of reading information recorded on a disk selectively taken out from a plurality of disks loaded in the disk magazine mounted in the disk player body. A magazine changing unit is disposed adjacent to the disk player body capable of selectively transferring a desired one of disk magazines accommodated in the magazine changing unit into the disk player body.

9 Claims, 5 Drawing Sheets

DISK PLAYER SYSTEM WITH AN AUTOMATIC MAGAZINE CHANGER

BACKGROUND OF THE INVENTION

This invention relates to a disk player and more particularly to a disk player system provided with a magazine changer for selectively transferring a magazine in which a plurality of disks are accommodated.

Recently, there has been provided a disk player system in which a magazine accommodated with a plurality of compact disks to be freely taken in or out is mounted, a desired disk is taken out from the magazine as occasion demands, and information on the disk is read by a reading head. Such disk player system is disclosed, for example, in the Japanese Patent Laid-open Publication No. 62-82554.

The conventional disk player of the type described above comprises a casing in which a support frame is disposed. The support frame is provided with a magazine accommodating member in which a magazine is inserted through a magazine insertion port formed in the front surface of the casing. The magazine is provided with a plurality of vertically stacked trays in each of which a compact disk is supported. The trays are arranged to be freely taken in or out with respect to the magazine with the center of a pin disposed at the front corner portion of the magazine. Each of the trays has a side end on which a projection is formed which is pushed outward to thereby position the compact disk on the tray to a read out position and in a state where the disk is supported to be rotatable by a compact disk supporting member. The information in the disk is read out by laser beams by means of a reading head.

The supporting frame of the disc player described above is supported at the bottom portion thereof by vibration proof rubbers in a floating manner or by spring means also in a floating manner.

The magazine is taken in or out from the predetermined position by a magazine transfer mechanism. An eject switch is located at the front surface of the casing and the eject switch activates a discharge mechanism for discharging outward the magazine in the predetermined position.

A vehicle such as bus or motorcar is equipped with a disk player of the character described above, and in a case where the motorcar is loaded with the disk player, the disk player is generally accommodated in a trunk room located at a rear portion of the motorcar. The magazine equipped with the desired disk is charged, i.e. put in the disk player by opening the trunk room before running the motorcar and the magazine changing operation is carried out by a driver from the driver's seat.

However, in a case where the desired disk does not exist in the disk player, it is necessary for the driver to stop the motorcar and open the trunk room to change the magazine now loaded by another magazine, thus being inconvenient. Even in another case where such disk player is not accommodated in the motorcar, the magazine exchanging operation is carried out manually by taking out the magazine in the disk player and inserting another magazine thereinto, thus being also inconvenient.

SUMMARY OF THE INVENTION

An object of this invention is to substantially eliminate the defects and drawbacks encountered in the prior art described above and to provide a disk player system provided with a magazine changing unit capable of automatically changing a plurality of magazines with respect to a disk player body to thereby optionally select a plurality of compact disks.

This and other objects can be acheived according to this invention by providing a disk player system comprising a disk player body including an outer casing and provided with a disk magazine insertion port through which a disk magazine is to be mounted in the disk player body which is capable of reading information recorded on a disk selectively taken out from a plurality of disks loaded in the disk magazine mounted in the disk player body and a magazine changing unit disposed adjacent to the disk player body capable of selectively transferring a desired one of disk magazines accommodated in the magazine changing unit into the disk player body.

In a preferred embodiment, the magazine changing unit comprises an outer casing, a table member installed in the casing to be vertically elevatable, a mechanism disposed in association with the table member for elevating the table member, a magazine holder mounted on the table member for accommodating a plurality of disk magazines, a detector for detecting a position of the table member and positioning the table member so that the desired disk magazine in the magazine holder opposes to the magazine insertion port formed to the disk player body, and a transfer mechanism for pushing the desired disk magazine from the magazine holder into the disk player body through the magazine insertion port and for taking out a disk magazine in the disk player body from the magazine holder.

According to the disk player system of the character described above, a magazine changing unit is disposed adjacent to a disk player body so that a desired one of magazines each loaded with a plurality of disks is selectively taken out from the magazine changing unit and mounted in the disk player body. The desired magazine is automatically charged in position through the magazine insertion in response to the magazine selection signal from an operator. The desired disk in the magazine is taken out therefrom in the disk player body and the information on the disk is then read by a reading head. The magazine in the disk player body is returned in the magazine changing unit in response to the magazine discharging signal from the operator after the necessary read-out operation.

According to this invention, as described, a plurality of magazines can be automatically changed with each other by specifically arranging the magazine changing unit in association with the disk player body of conventional type, for example. Thus, the selection of the plural disks can be effectively performed.

DESCRIPTION OF THE PREFERRED EMBODIMENTS

Figure 1:
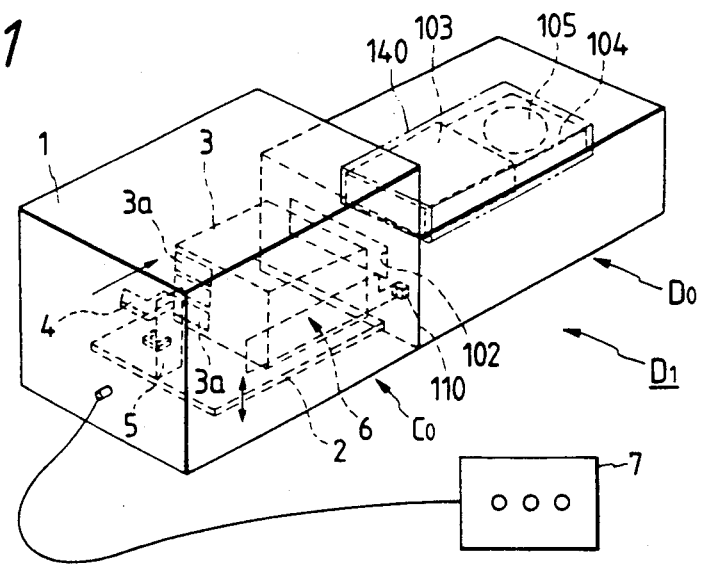
FIG. 1 is a perspective view showing a shematic structure of a disk player system provided with a magazine changing unit according to one embodiment of this invention.

For a better understanding of this invention, a disk player of conventional type will be described hereunder with reference to FIG. 10.

A conventional disk player $D_o$ comprises a casing 100 in which a support frame 101 is disposed. The support frame 101 is provided with a portion for accommodating a magazine. A magazine 103 is inserted into the magazine accommodating member through a magazine insertion port 102 formed in the front surface of the casing and supported therein. The magazine 103 is provided with a plurality of vertically stacked trays 104 in each of which a compact disk 105 is supported. The trays 104 are arranged to be freely taken in or out with respect to the magazine in a manner rotatable about a pin 106 disposed at the front corner portion of the magazine. Each of the tray 104 has a side end on which is formed a projection 104a which is pushed outward by a pushing member, not shown, to thereby position the compact disk 105 on the tray 104 to a read out position in a state where the disk is supported to be rotatable by a compact disk supporting member, not shown. The information in the disk is read out by laser beams by means of a reading head, not shown.

The supporting frame 101 of the disk player described above is supported at the bottom portion thereof by vibration proof rubbers 107, 107, --- , 107 in floating manner or by spring means 108, 108, --- 108 also in floating manner.

The magazine 103 is taken in or out from the predetermined position by a magazine transfer mechanism 109. An eject switch 110 is located at the front surface of the casing and the eject switch 110 activates a discharge mechanism, not shown, for discharging outward the magazine in the predetermined position.

The conventional disk player of the character described above has defects or drawbacks as described hereinbefore, when the disk player is accommodated in a vehicle such as bus or motorcar or even in a case where the disk player is placed other than in the vehicle.

This invention was conceived to substantially eliminate the defects or drawbacks encountered in the conventional disk player of the type described above and will be described in detail hereunder with reference to FIGS. 1 to 9.

Referring to FIG. 1, a disk player system $D_1$ provided with a magazine changing unit according to one preferred embodiment of this invention comprises a disk player body $D_o$ of the character similar to the disk player of the conventional type and a magazine changing unit $C_o$ operative connected to the disk player body $D_o$. The disk player body $D_o$ is provided with a magazine accommodating member 140 in which is accommodated a magazine 103 for accommodating a plurality of compact disks 105 in a stacked manner on a tray 104 so that the compact disks 105 can be taken in or out from the magazine 103.

The disk player body $D_o$ has a front surface in which a disk insertion port 102 is formed so that a desired magazine 103 accommodated in the magazine changing unit $C_o$ is inserted into the disk player body through the disk insertion port 102.

The magazine changing unit $C_o$ comprises a casing 1 in which a table 2 is disposed to be vertically movable, and on the table 2, a magazine holder 3 is mounted to a predetermined position. A plurality of magazines 103 are stacked vertically in the magazine holder 3 so as to be taken in or out from the magazine holder 3.

The magazine holder 3 has a rear surface, a part of which is opened as an opening 3a, against which is located a movable member of a magazine transfer mechanism 4 for pushing out the magazine accommodated in the magazine holder 3. A detector 5 for detecting the vertical height of the table 2 is disposed at a rear portion of the table 2, and the movement of the table 2 stops at a time when the desired magazine 103 in the magazine holder 3 is transferred to a position opposing to the magazine insertion port 102.

An eject switch 110 is attached to the front surface of the disk player body $D_o$ and the eject switch 110 is operated by an eject switch operating mechanism 6 mounted on the side wall of the casing 1.

The disc player system $D_1$ provided with the magazine changing unit $C_o$ according to this invention is controlled by a control board 7, which may be set near a driver's seat in the case where the disk player system $D_1$ is accommodated in a vehicle.

Figure 2:
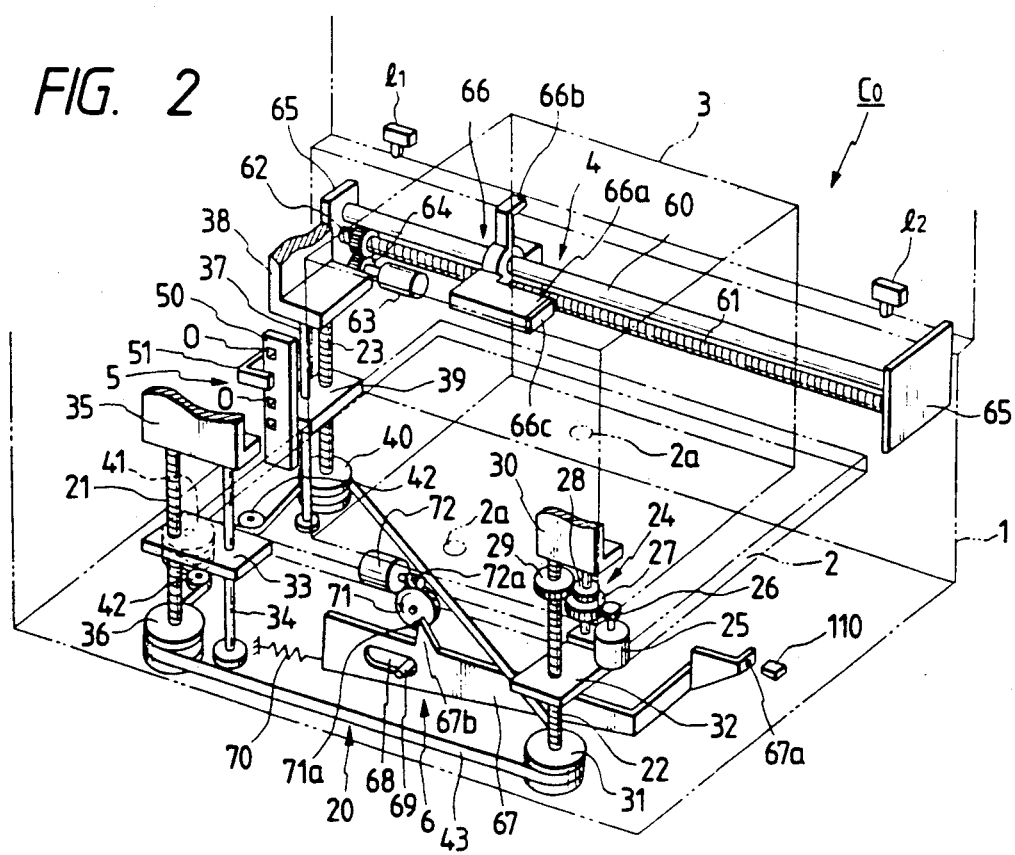
FIG. 2 is a constructional perspective view of the magazine changing unit, in an enlarged scale, shown in FIG. 1.

The magazine changing unit $C_o$ of the disk player system $D_1$ according to this invention will be described hereunder in detail with reference to FIG. 2. Referring to FIG. 2, the table 2 is vertically moved by a table elevating mechanism 20, which is provided with feed screws 21, 22 and 23 for elevating the table 2 at three portions thereof supported.

A driving mechanism 24 is mounted on an upper portion of the feed screw 22 and the driving mechanism 24 comprises an electric motor 25, a drive gear 26 for the motor 25, a first intermediate gear 27 meshed with the drive gear 26, a second intermediate gear 28 formed integrally with the first intermediate gear 27, and a follower gear 29 secured to the threaded body of the feed screw 22 and meshed with the second intermediate gear 28. The feed screw 22 is provided with an uppermost portion supported by a supporting frame 30 which is rotatable and with a lower end to which a driving pulley 31 is secured. A supporting ear-like member 32 projecting from the table 2 is screw-engaged with the intermediate threaded portion of the feed screw 22, whereby the table 2 is vertically moved by the rotation of the feed screw 22.

The feed screw 21 is screw-engaged with a supporting ear-like member 33 secured to the table 2, and a guide bar 34 is slidably engaged with the supporting ear-like member 33 in a fashion parallel to the feed screw 21. The upper ends of the feed screw 21 and the guide bar 34, both extend vertically in parallel, and are supported to be rotatable by a supporting frame 35, and a follower pulley 36 is secured to the lower end of the feed screw 21.

A guide bar 37 is arranged so as to extend in parallel to the feed screw 23 and the upper ends of the feed screw 23 and the guide bar 37 are supported by a supporting frame 38. The feed screw 23 is screw-engaged with a supporting ear-like member 39 projecting from the table 2 at the intermediate portion of the feed screw 23 and a follower pulley 40 is secured to the lower end of the feed screw 23.

A tension adjusting pulley 41 is arranged between the aforementioned first and second follower pulleys 36 and 40 and the position of the tension adjusting pulley 41 can be variably adjusted by an adjusting mechanism, not shown. On both sides of the tension adjusting pulley are disposed guide pulleys 42 and 42. A timing belt 43 is stretched about the follower pulley 31, the first and second follower pulleys 36 and 40, and the tension adjusting pulley 41. According to the structure described above, the table 2 can be moved vertically with the horizontal state thereof kept at three positions.

The detector 5 for detecting the vertical height of the table 2 is provided with a detection plate 50 vertically arranged at the rear edge portion of the table 2. The detection plate 50 is provided with many openings O, O, ---, O with predetermined spaces between each other and a photosensor 51 of transmission type is supported by a fixing member, not shown, opposite to the openings. When the photosensor 51 detects the desired one opening 0 of the detection plate 50, the motor 25 of the driving mechanism 24 stops.

A magazine transfer device 4 is mounted on one side wall of the casing 1 and comprises a guide bar 60 extending horizontally and a feed screw 61 arranged in parallel to the guide bar 60. A gear 62 is engaged with one end, lefthand end in the illustration of FIG. 2, of the feed screw 61 and a drive gear 62 of an electric motor 63 is engaged with the gear 62. Both ends of the guide bar 60 and the feed screw 61 are supported by supporting plates 65 respectively. A movable member 66 is mounted to the guide bar 60 to be movable horizontally with respect to the guide bar 60 and the feed screw 61. The movable member 66 is provided with a transfer arm 66a for transferring the magazine accommodated in the magazine holder 3 when the transfer arm 66a abuts against the rear end of the magazine and provided with an operation arm 66b for operating limit switches l₁ and l₂ for limiting the moving range of the movable member 66.

The eject operating mechanism 6 is mounted on another side wall, opposing to the side wall of the casing 1 on which the magazine transfer mechanism 4 is mounted. The eject operating mechanism 6 comprises an L-shaped operating plate 67 having a front end 67a opposing to the eject switch 110 provided on the front surface of the disk player body $D_o$ (FIG. 1). The operating plate 67 also has a wide portion in which a slit 68 is formed. With the slit 68 is engaged a guide pin 69 secured to the side wall of the casing 1, and the operating plate 67 is moved along the guide pin 69 to operate the eject switch 110. The operating plate 67 is urged rearwardly, i.e. rightwardly in the illustration, by a spring means 70. An engaging projection 67b is formed on the upper edge of the operating plate 67 and a pin 71a of a rotary gear 71 is engaged with the engaging projection 67b. The rotary gear 71 is rotated in a counterclockwise direction in the illustration of FIG. 2 by a worm 72a of an electric motor 72, whereby the pin 71b engages with the projection 67b to push the same or disengages therefrom so as to reciprocate the operating plate 67 in the horizontal direction.

Figure 3:
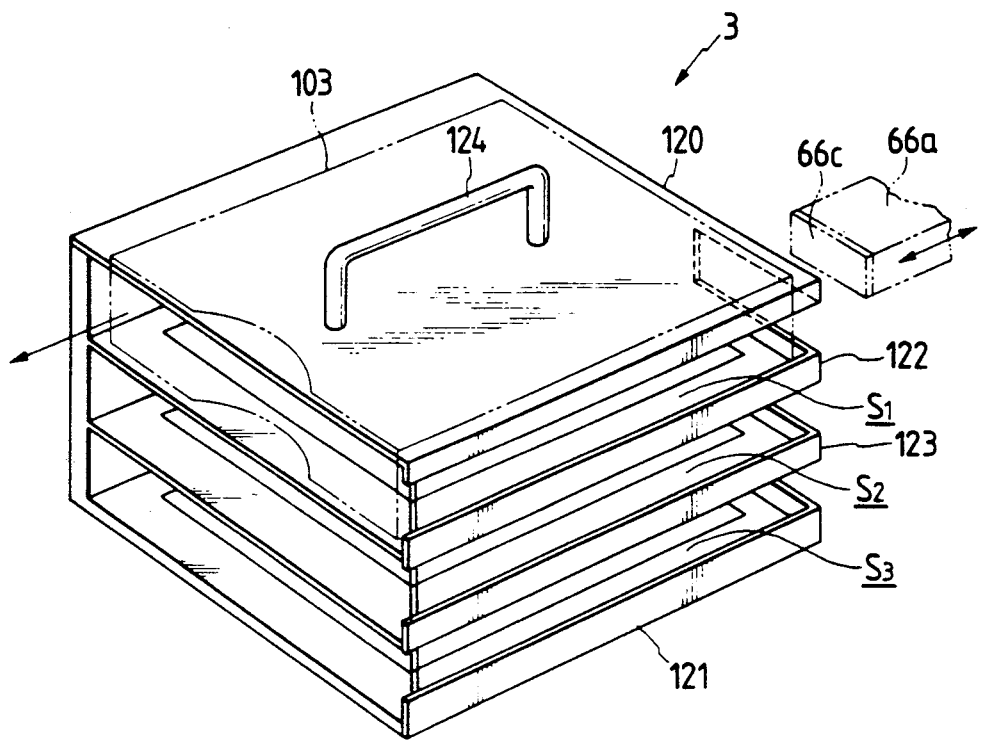
FIG. 3 is a perspective view of a magazine holder mounted in the disk player body shown in FIG. 1.
Figure 4:
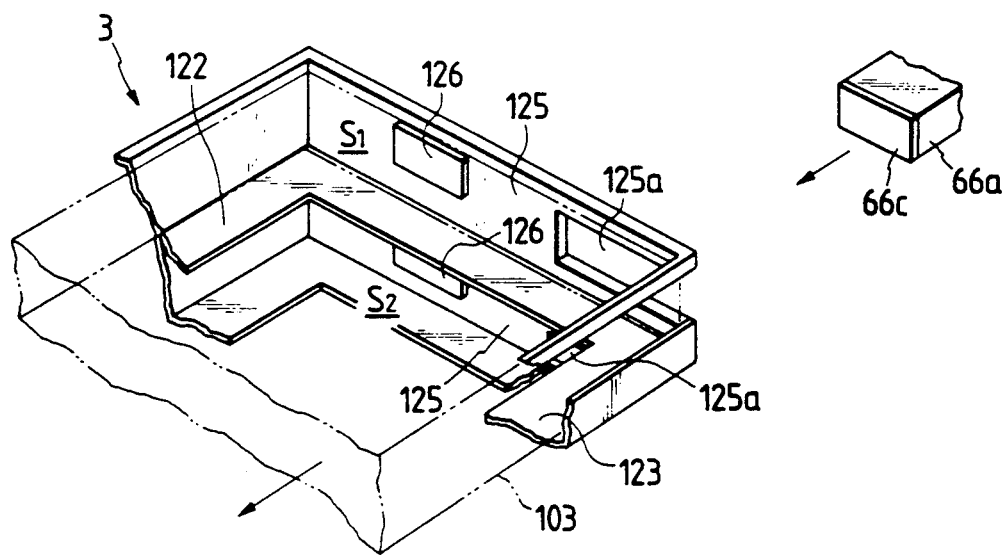
FIG. 4 is a perspective view, partially broken away, of the magazine holder for showing the inner structure thereof.
Figure 5:
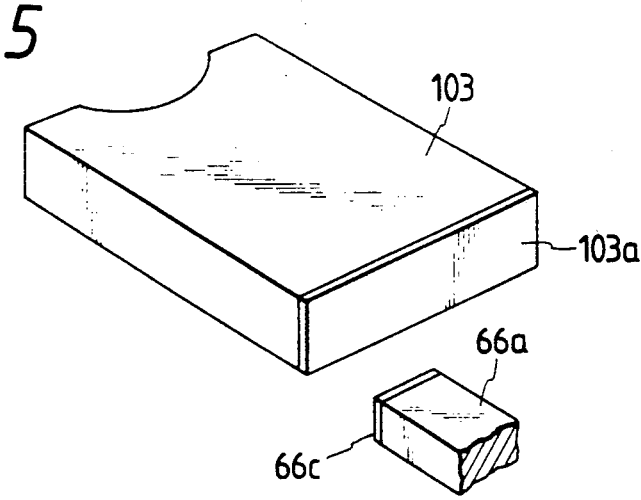
FIG. 5 is a perspective view of a magazine.

The details of the magazine holder 3 mounted on the table 2 is illustrated in FIG. 3. Referring to FIG. 3, the magazine holder 3 and FIG. 4 is generally of a box-shaped configuration having a top plate 120 equipped with a handle 124, a bottom plate 121, and a plurality of shelf plates 122 and 123 between the top and bottom plates 120 and 121 with spaces $S_1$, $S_2$ and $S_3$ therebetween into which the magazines 103 are slidably mounted. The rear portions of the respective spaces $S_1$, $S_2$ and $S_3$ are defined by end plates 125, 125 and 125 to which magnet means 126, 126 and 126 are mounted respectively for the purpose of stably holding the magazines 103 in the respective spaces by the magnetic engagement of the magnets with metal portions 103a applied to the rear end portions of the magazines 103 as shown in FIG. 5.

Each of the rear end plate 125 is provided with an opening 125a at the right end portion, as viewed in FIG. 4, which opposes to the transfer arm 66a of the movable member 66 of the transfer mechanism 4. The transfer arm 66a is provided with a front surface on which is also mounted a magnet 66c which acts to push out the magazine 103 in the magazine holder 3 or firmly hold the rear end of the magazine transferred from the disk player body $D_o$.

Figure 6:
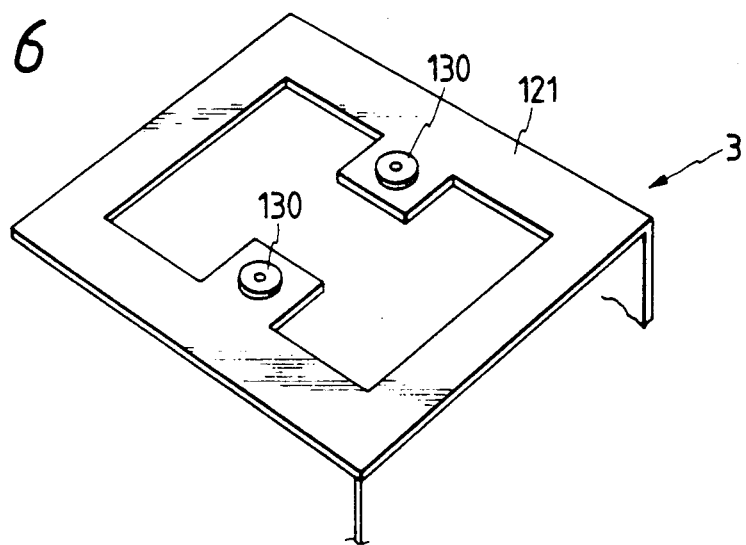
FIG. 6 is a perspective view of the bottom portion of the magazine holder.

Positioning projections 130 and 130 are provided for the surface of the bottom plate 121 of the magazine holder 3 as shown in FIG. 6 and the positioning projections 130 are adapted to engage with the positioning holes 2a of the table 2 shown in FIG. 2 to position the magazine holder 3 on the table 2.

The disk player system provided with a magazine changing unit according to this invention of the character described above will operate in the following manner.

For example, referring to FIG. 7, in a case where it is desired to mount the magazine 103 disposed on the intermediate shelf of the magazine holder 3 in the magazine accommodating portion 140 of the disk player body $D_o$, an operator pushes a switch on the control board to select the intermediate magazine shelf. The table 2 moves and when the intermediate magazine 103 is moved to a position opposing to the magazine insertion port 102 of the disk player body $D_o$, i.e. when the sensor 51 of the detector 50 detects one opening O corresponding to the desired stop position of the table 2, the table 2 stops (FIG. 7A). The movable member 66 of the transfer mechanism 4 is then moved forwardly till the transfer arm 66a of the movable member 66 abuts against the rear end surface of the magazine 103. At this moment, the magnet 66c secured to the front end of the transfer arm 66a magnetically fixes the metal plate 103a secured to the rear end of the magazine 103 to firmly hold the same. The movable member 66 advances and the magazine 103 is pushed into the magazine accommodating member 140 (FIG. 7B).

Figure 10:
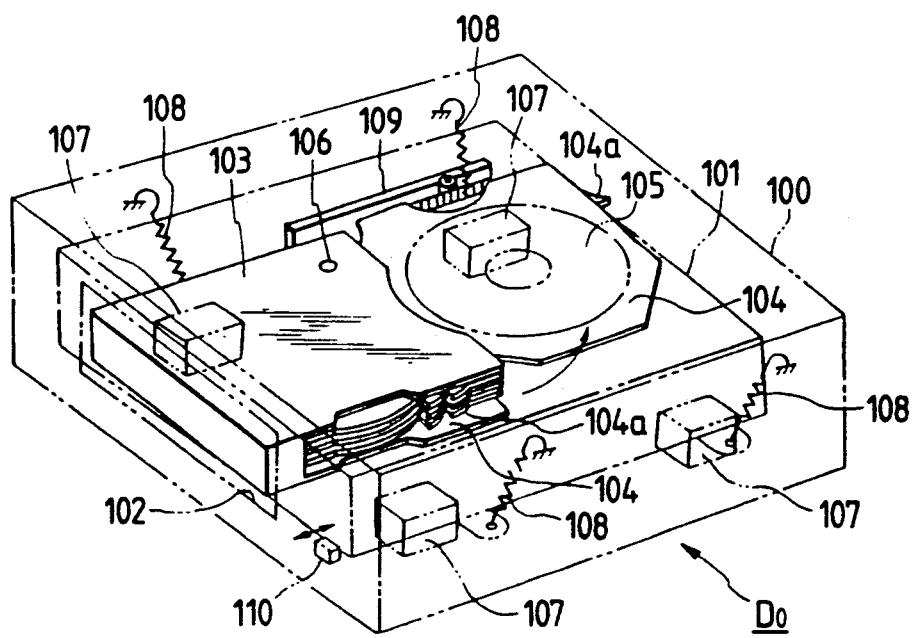
FIG. 10 is a perspective view of a disk player of conventional structure.

The insertion of the magazine 103 into the magazine accommodating member 140 is controlled by a vibration proof mechanism (vibration proof rubber 107 and spring 108) shown in FIG. 10 in a damped manner, so that any damper mechanism is not needed in addition to the members of the conventional disk player.

When the accommodation of the magazine 103 in the magazine accommodating member 140 has been completed, the operating arm 66c of the movable member 66 abuts against the limit switch l₂ to reversely drive the motor 63 of the magazine transfer mechanism 4, whereby the movable member 66 is slightly backwardly moved to separate the movable member 66 from the metal plate 103a of the magazine 103. The magazine accommodating member 140 is slightly lowered by about 3 mm, for example, by the weight of the magazine 103 inserted therein because the magazine accommodating member 140 is supported in the floating manner (FIG. 7C).

Figure 8:
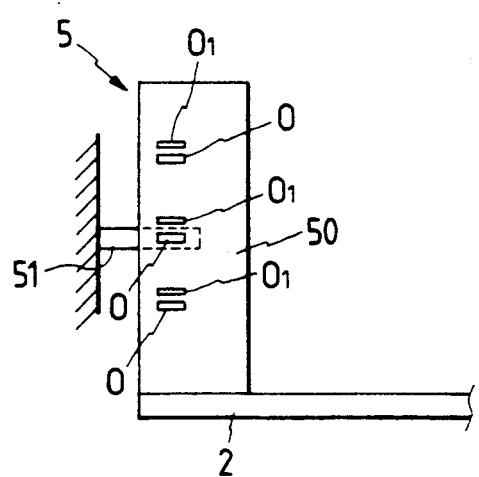
FIG. 8 is a brief illustration of a position detector.
Figure 7A:
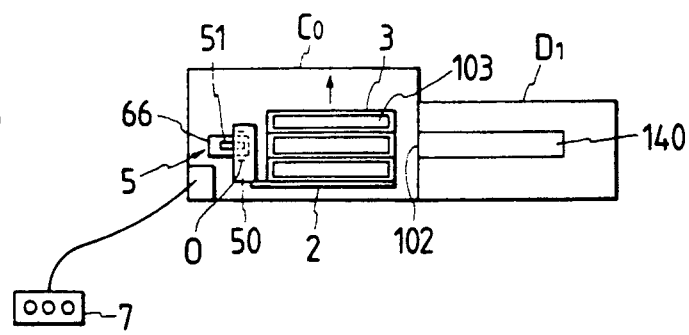
FIGS. 7A to 7E are illustrations of the disk player system provided with the magazine changing unit for explaining the operation thereof, respectively.
Figure 7B:
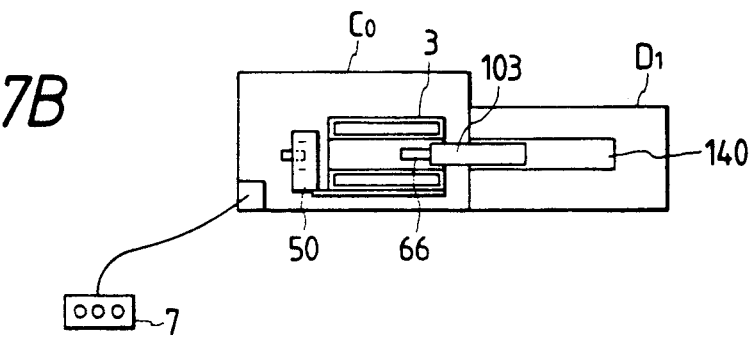
Figure 7C:
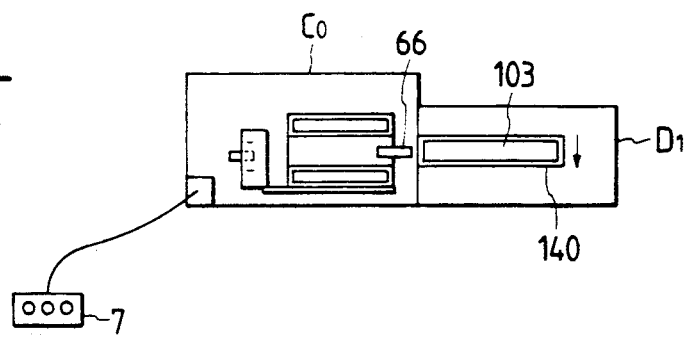
Figure 7D:
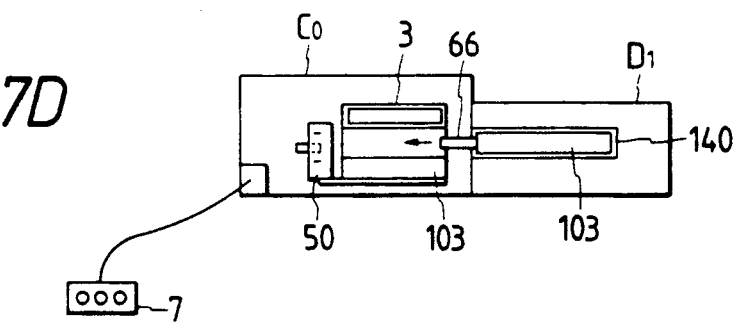
Figure 7E:
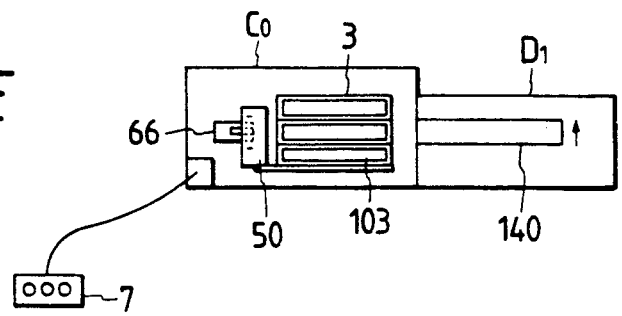

In a case where it is required to change the magazine 103 in the accommodating member 140 with a new magazine, the table 2 is first lowered by about 3 mm from the state shown in FIG. 7C for drawing out the magazine 103 from the intermediate magazine accommodating member 140. That is, as shown in FIG. 8, the table 2 is slightly lowered by the time when the sensor 51 detects one of openings O₁, O₁, ---, O₁ preliminarily formed on upper portions of the openings O, O ---, O on the detection plate 50 for the insertion of the magazine. Under this state, the movable member 66 is forwardly moved to attract and hold the metal plate 103a secured to the rear end of the magazine 103 (FIG. 7D). In these operations, it is necessary to release the locking of the magazine 103 in the magazine accommodating member 140, and for this purpose, the eject operating mechanism 6 operates to push the eject switch 110 to thereby rotate the feed screw 61 to accommodate the magazine 103 in the intermediate shelf of the magazine holder 3 on the table 2. The backward movement of the movable member 66 stops when the operating arm 66c thereof abuts against the rear side limit switch l₁ (FIG. 7E). At this momemt, the magazine accommodating member 140 is slightly displaced upward because of the emptiness thereof.

When the magazine 103 mounted on the other shelf of the magazine holder 3 is next selected to be taken out, the table 2 is elevated to a required portion from the position shown in FIG. 7E and substantially the same operations as those described above are carried out in a repeated manner. Namely, the displacement of the table 2 is arithmatically calculated in accordance with the position of the table 2 before the selection of the desired magazine and with the selected table position. When the table 2 reaching the predetermined position is detected by the detector 50, the motor 25 provided for moving the table 2 stops.

In a modified embodiment, the determination of the table position may be carried out by the manner in which the reference table position is preliminarily set so that the table is always returned to this reference position after one operation of the table is completed and again moved from this reference position to the desired position. In the described embodiment, the movement of the movable member 66 is limited by the limit switches l₁ and l₂, but in place thereof, the movement of the movable member may be controlled by computer processing signals transmitted from an encoder attached to a motor.

Figure 9:
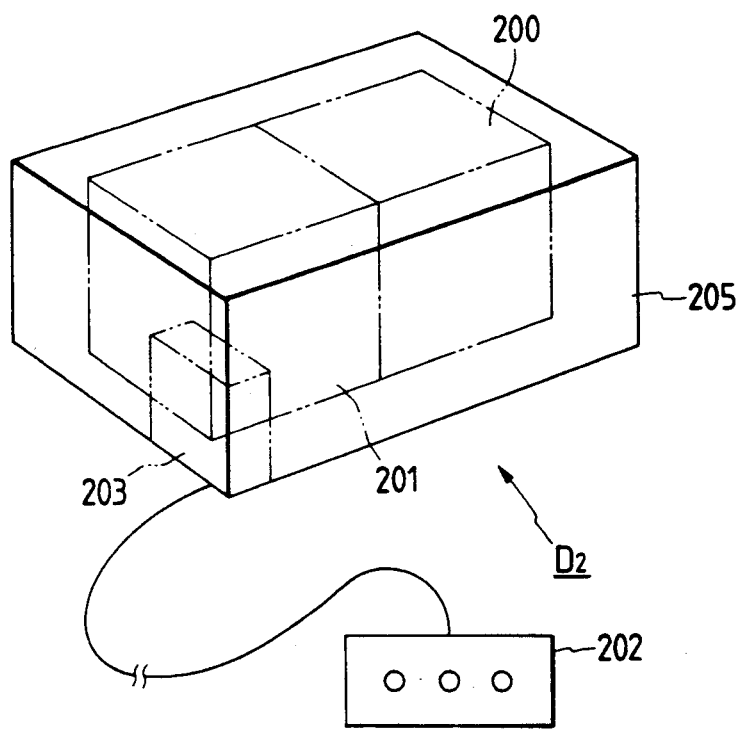
FIG. 9 is a perspective view showing a schematic structure of a disk player system provided with a magazine changing unit according to another embodiment of this invention.

The embodiment described above with reference to FIGS. 1 to 8 utilizes the conventional disk player as a disk player body and the specific magazine changer is additionally provided for the disk player body. FIG. 9 shows another embodiment according to this invention in which a new disk player body 200 and a magazine changing unit 201 are accommodated in a casing 205. In this embodiment, the control board 202 is connected to a control unit 203 in the casing 205 to thereby control both the disk player body 200 and the magazine changing unit 201. According to this arrangement, the mechanical eject operating mechanism 6 for operating the eject switch 110 of the former type may be eliminated.

What is claimed is:

1. A disk player system comprising:
 a disk player body including an outer casing and provided with a disk magazine insertion port through which a disk magazine is to be mounted in the disk player body which is capable of reading information recorded on a disk selectively taken out from a plurality of disks loaded in the disk magazine mounted in the disk player body; and
 a magazine changing unit disposed adjacent to said disk player body having a plurality of disk magazines and selectively transferring a desired one of disk magazines accommodated in the magazine changing unit into said disk player body,
 wherein said magazine changing unit comprises an outer casing, a table member installed in said casing to be vertically elevatable, means disposed in association with said table member for elevating said table member, a magazine holder mounted on said table member for accommodating a plurality of disk magazines, a detector means for detecting a position of the table member and positioning the table member so that the desired disk magazine in the magazine holder opposite to said magazine insertion port formed in the disk player body, and a transfer means for pushing the desired disk magazine from the magazine holder into the disk player body through the magazine insertion port and for taking out a disk magazine in the disk player body to the magazine holder.

2. A disk player system according to claim 1, wherein said table member elevating means comprises a plurality of feed screw means which are vertically secured to the outer casing of said magazine changing unit and adapted to vertically displace said table member with the horizontal position of said table member supported by said feed screw means.

3. A disk player system according to claim 1, wherein said detector means comprises a photosensor.

4. A disk player system according to claim 1, wherein said transfer means is secured to one side wall of the outer casing of said magazine changing unit and comprises a guide bar extending horizontally along the side wall, and a movable member to be guided by said guide bar, said movable member comprising a transfer arm to abut against the desired magazine to transfer the same and an operation arm to operate a limit switch means for limiting a movement of said movable member.

5. A disk player system according to claim 1, wherein said disk player body is equipped with a vibration proof means for attaining a damping function for the insertion of said disk magazine from said magazine changing unit to said disk player body through the magazine insertion port.

6. A disk player system according to claim 5, wherein said vibration proof means comprises vibration proof rubber means mounted on the outer casing of said disk player body and spring means secured to said vibration proof rubber means.

7. A disk player system according to claim 1, wherein said disk player body is provided with an eject switch means independent from said magazine changing unit for ejecting the disk magazine from the magazine holder into a predetermined magazine accommodating portion in the disk player body and said magazine changing unit further comprises means for operating said eject switch means.

8. A disk player system according to claim 1, wherein said disk player body and said magazine changing unit are accommodated in one outer casing.

9. A disk player system comprising:
- a disk player body including an outer casing and provided with a disk magazine insertion port through which a disk magazine is to be mounted in the disk player body which is capable of reading information recorded on a disk selectively taken out from a plurality of disks loaded in the disk magazine mounted in the disk player body; and
- a magazine changing unit disposed adjacent to said disk player body having a plurality of disk magazines and selectively transferring a desired one of disk magazines accommodated in the magazine changing unit into said disk player body,
  wherein said disk player body is provided with an eject switch means independent from said magazine from the magazine changing unit for ejecting the disk magazine from the magazine from the magazine holder into a predetermined magazine accommodating portion in the disk player body and said magazine changing unit further comprise means for operating said eject switch means.

* * * * *